United States Patent [19]

Jansen

[11] Patent Number: 5,173,097
[45] Date of Patent: Dec. 22, 1992

[54] PROCESS FOR THE MANUFACTURE OF OBJECTS WITH SMALL COMPLEX CROSS-SECTIONS

[75] Inventor: Klaus Jansen, Hamburg, Fed. Rep. of Germany

[73] Assignee: National Research Development Corporation, London, United Kingdom

[21] Appl. No.: 634,862
[22] PCT Filed: May 17, 1990
[86] PCT No.: PCT/GB90/00765
   § 371 Date: Jan. 2, 1991
   § 102(e) Date: Jan. 2, 1991
[87] PCT Pub. No.: WO90/14316
   PCT Pub. Date: Nov. 29, 1990

[30] Foreign Application Priority Data

May 17, 1989 [DE] Fed. Rep. of Germany ....... 3916078
Nov. 5, 1989 [DE] Fed. Rep. of Germany ....... 3936713

[51] Int. Cl.⁵ .......................... C03C 25/06; G02B 6/00
[52] U.S. Cl. .......................... 65/3.15; 65/2; 65/4.2; 65/13; 65/31
[58] Field of Search ............ 65/2, 3.11, 3.12, 4.2, 65/4.21, 13, 3.15, 31; 428/397

[56] References Cited

U.S. PATENT DOCUMENTS

| 3,624,816 | 11/1971 | Strack | 65/31 X |
|---|---|---|---|
| 3,674,452 | 7/1972 | Strack | 65/31 X |
| 3,771,983 | 11/1973 | Stracka | 65/31 |
| 3,989,495 | 11/1976 | Siegmund | 65/31 |
| 4,011,071 | 3/1977 | Siegmund | 65/31 |
| 4,026,693 | 5/1977 | Sato | 65/31 |
| 4,046,537 | 9/1977 | Deserno et al. | 65/2 |
| 4,530,565 | 7/1985 | Markle | 350/96.10 |
| 4,630,890 | 12/1986 | Ashkin et al. | 65/3.11 X |
| 4,750,926 | 6/1988 | Berkey | 65/2 |
| 4,799,949 | 1/1989 | Keck et al. | 65/3.12 |
| 4,986,939 | 1/1991 | Hoffmann | 264/1.7 |

FOREIGN PATENT DOCUMENTS 2142983 2/1973 France .
2307638 11/1976 France .
2189480 10/1987 United Kingdom .

Primary Examiner—Robert L. Lindsay
Attorney, Agent, or Firm—Cushman, Darby & Cushman

[57] ABSTRACT

A need often arises for micro-optical components, such as optical fibres and couplers, and micromechanical components with complex cross-sections which are different at opposite ends or, for directional couplers, at points along the length of the couplers. In the present invention, a soluble material 38 is added to at least one primary preform 35 to make a secondary preform 37 of circular cross-section. The secondary preform is then drawn to reduce the cross-section of the primary preform as required but the cross-sectional shape of the secondary preform is preserved. The soluble material is then removed and then part of the resulting product is heated and plastically deformed to give the required different ends 39 and 40 or other different cross-sections. In another aspect of the invention two soluble materials are used with different solubilities. After the most soluble material has been removed, an operation involving the less soluble material can be carried out, and then the less soluble material is at least partially removed.

25 Claims, 16 Drawing Sheets

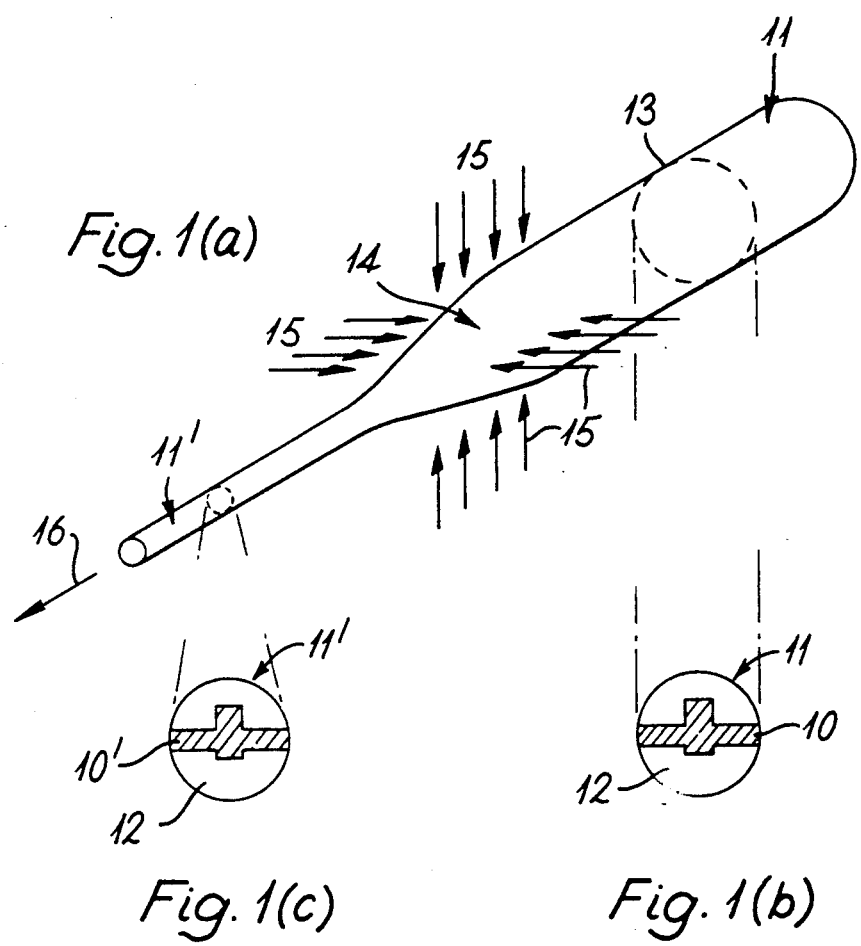

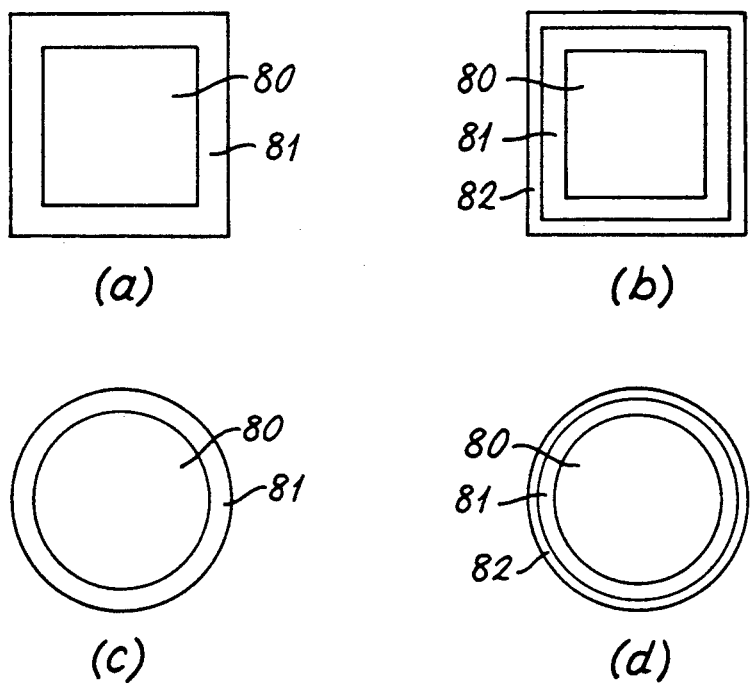
Fig. 11
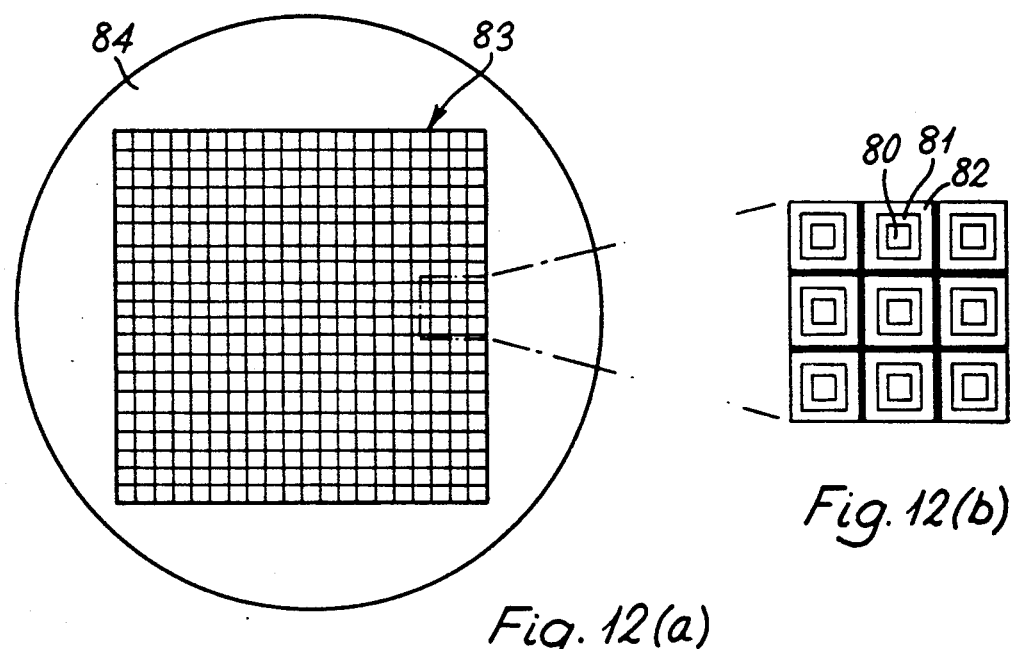
Fig. 12(b)
Fig. 12(a)

PROCESS FOR THE MANUFACTURE OF OBJECTS WITH SMALL COMPLEX CROSS-SECTIONS

BACKGROUND OF THE INVENTION

1. Field of the Invention

The present invention relates to methods for the manufacture of objects with small complex cross-sections, particularly optical fibres, micro-optical components, such as couplers, and micromechanical components.

2. Description of the Related Art

Fibre optics and integrated optic components are used in optical information technology and measuring techniques. Such components employ optical waveguides which determine their properties either as a result of their overall structure or by virtue of the cross-section of the waveguide or of external conditions.

Optical components in which the overall structure determines properties include star junctions and directional couplers in which two or more waveguides gradually converge or separate or are in close proximity over a defined length to such an extent that their fields interact. (See Unger, Optische Nachrichtentecknik, Bd.II Huthig-Verlag 1984.)

Components in which the cross-section of the waveguide determines its properties include integrated-optic acousto-optical beam deflectors in which light conducted by an elongated rectangular section of waveguide interacts with an acoustic wave propagating along the surface of the waveguide. (See F. Auracher, Planar Electro-optic and Acousto-optic Bragg Deflectors in: Integrated Optics, Hrsg. S. Martinelli, A. N. Chester, NATO ASI Series, Plenum Publication Corp., NY 1981.)

A known problem which arises with different components of the above types in optical measuring and information systems is the difficulty in coupling optical waveguides together in a low loss configuration. In most cases this problem can be overcome by using glass fibres which are highly flexible and can be adapted to most dimensional conditions. However such optical fibres usually have circular cross-sections and in the case of direct butt joints to different cross-sections and sizes of waveguide in various components high coupling losses occur (see A. Mahapatra et al. "Thermal Tapering of Ion Exchanged Channel Guides in Glass", Optical Letters, Volume 13, No. 2, 1988). Suitable coupling components must not only match in cross-section, shape and size but must also allow optical fields to match; that is although a change in optical modes may be allowed or required in passing through the coupling components, significant loss of optical energy must be prevented. Modes which radiate from the coupling components must not be generated.

Known solutions in the form of glass fibre bundles exist for these coupling problems when joining multimode waveguides having different cross-sections (see H. Naumann, G. Schroder, Bauelemente der Optik, Hanser-Verlag) or stacked optical waveguides—see U.S. Pat. No. 4,530,565 (David A. Markle). All these solutions are based on couplers formed by subordinate waveguides having cross-sections which are brought together at the ends of the coupler to conform with the different cross-sections of the waveguides which are to be coupled. The above mentioned U.S. Pat. No. 4,530,565 describes such an arrangement for joining square waveguides to elongated cross-sections or large radius arcuate cross-sections.

However no process has been disclosed for manufacturing coupling elements according to the above principles where waveguides have cross-sections small enough to allow mono-mode operation in at least one dimension. Such elements are used, typically, in integrated optic components for measurement and information technology.

As described in U.S. Pat. No. 3,989,495 and U.K. Patent Application 2,189,480, optical components having complex cross-sectional shapes can be drawn by plastic deformation from preforms including additional glass which is etched away after drawing.

In the field of endoscopes for medical and technical diagnostic uses, where bundles of optical fibres fixed to each other at each end but unattached throughout the rest of their length are used, methods of manufacturing are known in which individual fibres are surrounded with a soluble glass before bundling and the resulting preform is then drawn to give the required cross-section (see such U.S. Pat. Nos. 4,389,089, 3,669,772 and 3,830,667).

SUMMARY OF THE INVENTION

According to a first aspect of the present invention there is provided a method of manufacturing objects with very small transverse dimensions from material which is capable of being drawn plastically, comprising the steps of forming a secondary preform from at least one primary preform formed in a first material by combining second material with the primary preform, the first and second materials both being capable of plastic deformation and one of the said materials being capable of removal from the other material using a removal agent, reducing the viscosity of a zone of the secondary preform while plastically drawing out the secondary preform to give an elongated product with a reduced cross-section, the secondary preform having a cross-sectional boundary whose shape, as defined by relative dimensions, is preserved during drawing by the presence of the first and/or second materials, and removing the said one material from at least part of the said elongated product using the said agent, characterised in that the method includes plastically deforming the material of the product, after the said one material has been at least partially removed, to reshape the product permanently.

Usually, the said one material is the second material and the primary preform or preforms have a cross-sectional outer or inner periphery which is preserved during drawing by the presence of the second material.

The cross-sectional shape of the secondary preform may be circular or square but with a square cross-section the diagonal dimension of the square must be large compared with the largest cross-sectional dimension of the primary preform. For example the diagonal should be at least twice as long as the said largest cross-sectional dimensions. Secondary preforms with other cross-sectional shapes may also be used provided they are geometrically regular with respect to an axis normal to the cross-section and the largest cross-sectional dimension is large compared with the largest cross-sectional dimension of the primary preform.

For optical components, such as optical fibres and couplers, and some other components the first and second materials are vitreous materials. The removal agent is usually a liquid or gas which dissolves the second material physically or chemically.

Complex cross-sections can be etched from drawn secondary preforms by taking advantage of the high etching ratios which are possible between certain glasses and etchants. Etching ratios of between 100/1 and 1000/1 or more are possible. For example glasses of types LaKN12 and SSK50, both of which are available from the Schott glassworks, are suitable, the former being much more difficult to etch than the latter.

An advantage of the first aspect of the invention is that parts of drawn prismatic fibres forming the elongated product can be manipulated to make optical coupling elements for devices with widely different cross-sectional shapes. Several different kinds of coupling elements and directional couplers can be made in this way.

The objects of the present invention include the provision of a manufacturing process for couplers which have the small dimensions for mono-mode operation mentioned above.

Making non-prismatic optical elements by manipulating prismatic fibres as outlined above, allows another object of the invention to be achieved, that is the production of coupling elements and directional couplers in which waveguides, or bundles, or other arrangements of waveguides are used which, at one end, are mono-mode with respect to one dimension and therefore suitable for coupling to a strip-waveguide optical fibre, while at the other end the cross-section is suitable for forming a high efficiency coupling with a circular or rectangular multi-mode optical waveguide. However a problem which may arise during manipulation is that the drawn product may be distorted in an unwanted way.

According to a second aspect of the present invention there is provided a method of manufacturing objects with very small transverse dimensions from material which is capable of being drawn plastically, comprising the steps of forming a secondary preform from at least one primary preform formed in a first material by combining second material with the primary preform, the first and second materials both being capable of plastic deformation, and one of the said materials being capable of removal from the other material using a removal agent, reducing the viscosity of a zone of the secondary preform while plastically drawing out the secondary preform to give an elongated product with a reduced cross-section, the secondary preform having a cross-sectional boundary whose shape, as defined by relative dimensions, is preserved during drawing by the presence of the first and/or second materials, and removing the said one material from at least part of the said elongated product using the said agent, characterised in that the first material includes third and fourth materials, the third material being removable from the fourth material using a further removal agent, and the method includes at least partially removing the third material from the fourth material after the said one material has been at least partially removed from the first material.

The third material may be used to grip the drawn first material, after the second material has been removed, to allow the first material to be manipulated so helping to overcome the problem of unwanted distortion during manipulation mentioned above. The third material may then be entirely removed.

According to a third aspect of the present invention there is provided a method of manufacturing objects with very small transverse dimensions from material which is capable of being drawn plastically, comprising the steps of forming a secondary preform from at least one primary preform formed in a first material by combining second material with the primary preform, the first and second materials both being capable of plastic deformation, and one of the said materials being capable of removal from the other material using a removal agent, reducing the viscosity of a zone of the secondary preform while plastically drawing out the secondary preform to give an elongated product with a reduced cross-section, the secondary preform having a cross-sectional boundary whose shape, as defined by relative dimensions, is preserved during drawing by the presence of the first and/or second materials, and removing the said one material from at least part of the said elongated product using the said agent, characterised in that the said product includes a portion at one end which has not been drawn, or has been only partially drawn.

The third aspect of the invention can be used in making endoscopes where a bundle of optical fibres may form the primary preform or the primary preform may include at least two such bundles, one to conduct light to illuminate an object, and one to receive light for an image of the object. The end of the bundle which has not been drawn, or only partially then gives an enlarged image.

For optical components made according to all these aspects, it is nearly always necessary to coat the product after the, at least partial, removal of the second material in order to set the numerical aperture of the component by choice of the coating material. The coating is also useful in facilitating polishing and locating the component in its final position.

BRIEF DESCRIPTION OF THE DRAWINGS

Certain embodiments of the invention will now be described with reference to the accompanying drawings, in which:

FIG. 1(a) illustrates a method used in the invention in which a preform is drawn plastically, FIGS. 1(b) and 1(c) show cross-sections before and after drawing, respectively.

FIGS. 11(a) to 11(d) show different types of optical fibres which can be bundled together in making an endoscope, FIGS. 12(a) and 12(b) show the cross-section of a preform, and an enlarged portion of the cross-section respectively, for use in making an endoscope.

DETAILED DESCRIPTION OF THE PRESENTLY PREFERRED EXEMPLARY EMBODIMENTS

Figure 2A:
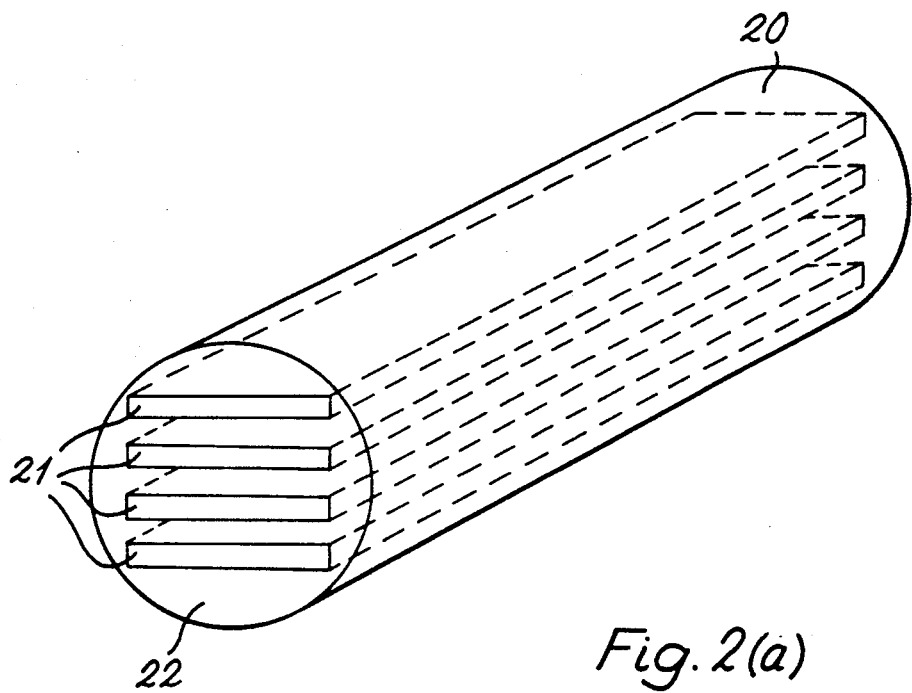
FIG. 2(a) shows a preform for use in making certain optical fibres and couplers.
Figure 2B:
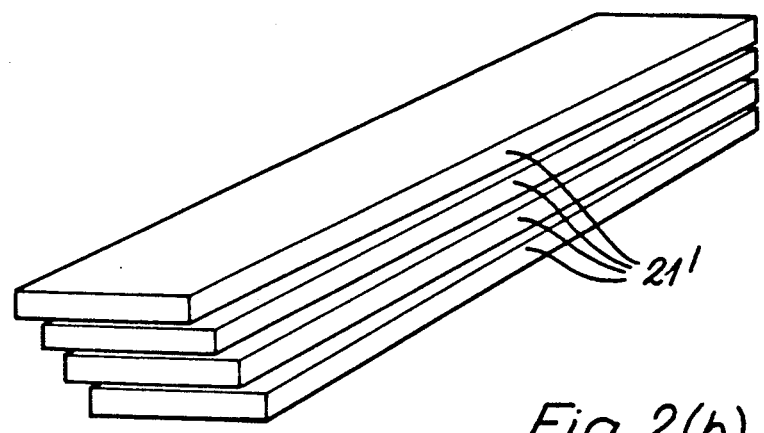
FIG. 2(b) shows an intermediate stage in a method embodiment according to the first aspect of the invention.

A method of manufacturing virtually prismatic optical waveguides having complex cross-sections is first explained as a preliminary to describing embodiments of the invention. In FIG. 1(a), a primary preform 10 of acid insoluble glass and having a complex cross-section is formed into a secondary preform 11 having a circular cross-section by the addition of acid soluble glass 12. FIG. (1b) shows the cross-section of the secondary preform as it appears at a point 13 in FIG. 1(a).

The object is to produce a glass fibre 10' (FIG. 1(c)) which has the same shape, that is the same relative dimensions, as the preform 10 but is much smaller in cross-section. The method consists of heating the glass, for example by means of a resistance furnace or hydrogen burners in a zone 14 as indicated by the groups of arrows 15. Heating the glass reduces its viscosity in the zone and at the same time a tensile longitudinal load is applied to the preform in the direction of the arrow 16 to draw a fibre 11' from the secondary preform by plastic deformation. The shape of the preform 10 is preserved in the fibre 11' as shown in cross-section in FIG. 1(c).

The drawn fibre is then usually cut off in the usual way to the left (as shown in FIG. 1(a)) of the zone 14 although in some objects made according to the invention at least part of the preform is required.

The last step in the method is to dissolve or leach the acid soluble glass 12 from the fibre 11' to produce a fibre having the same cross-sectional shape as the preform 10 but of very much reduced dimensions.

Any of the well known soluble and insoluble glass may be used and in this context the term insoluble means relatively insoluble compared with the soluble glass, or insoluble by an agent which dissolves the soluble glass.

Figure 2C:
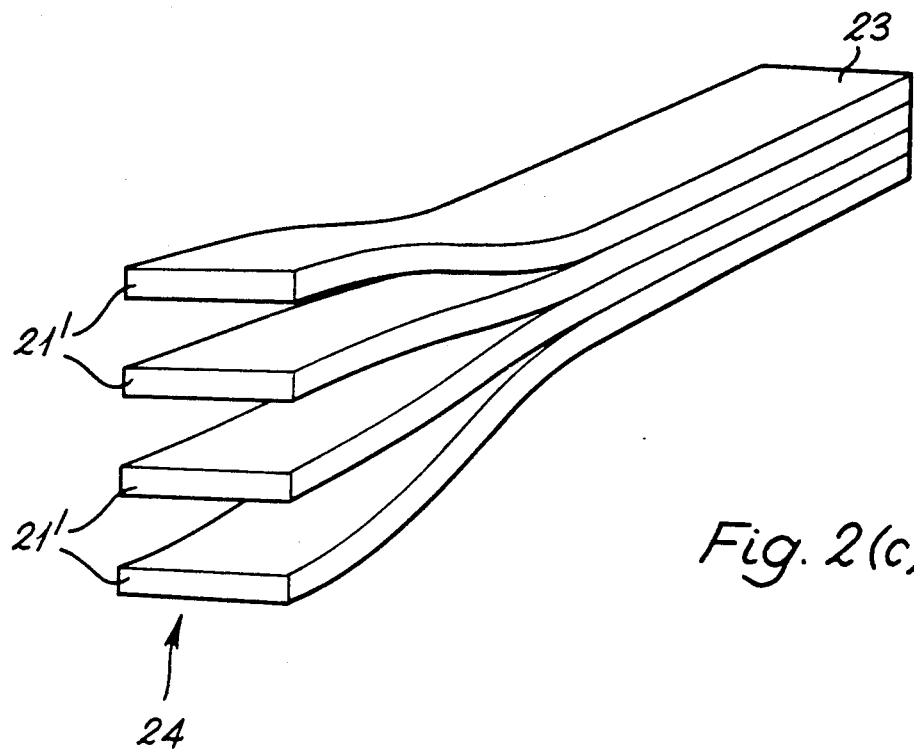
FIGS. 2(c) and 2(d) show optical couplers made from the preform of FIG. 2(a).
Figure 2D:
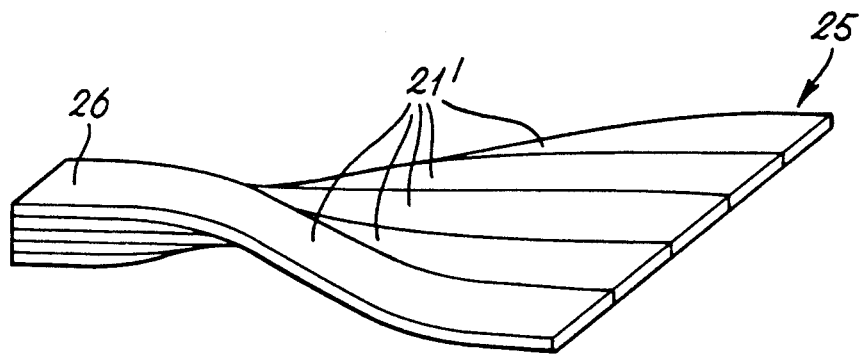

FIG. 2(a) shows a secondary preform 20 which can be used to manufacture a number of different types of coupling elements having different end configurations. A stack of rectangular section glass fibres 21, in this example four such fibres, is contained in supplementary material 22 which is a glass of comparatively high chemical or physical solubility relative to the fibres 21. The secondary preform 20 has a circular cross-section by virtue of the addition of the relatively high solubility glass 22. The secondary preform 20 is drawn in the way illustrated in FIG. 1(a) and then after cutting the drawn product from the preform, the supplementary material 22 is dissolved leaving, in this example, four optical waveguides 21' of greatly reduced dimensions but the same shape as the preform optical waveguides of FIG. 2(a). The waveguides 21' may be cemented or fused together to form different types of coupling elements. For example in FIG. 2(c) the waveguides 21' are fixed together at one end 23 but are heated and shaped by plastic deformation to be spaced apart at the other end 24. Such a coupler may be used to couple several waveguides at the end 24 to a single waveguide having a larger cross-section at the end 23. In another arrangement shown in FIG. 2(d) the fibres 21' are heated, shaped and joined side by side at one end 25 and above one another at the other end 26 to provide a coupling component which is suitable for coupling a square section waveguide at the end 26 with a wide flat strip waveguide at the end 25. In a variation of this process the soluble material 22 is not initially removed at the end 26 so that the waveguides 21' are held together while in the intermediate part of the coupler these waveguides are shaped and brought together to form at the end 25 the required elongated shape. The material 22 is then removed at the end 26 where the waveguides 21' are fused together and then the whole coupler is given a suitable coating.

A secondary preform 28 for an optical coupler for coupling individual optical fibres to a multi-mode fibre is shown in FIG. 3. The secondary preform contains a large number of rectangular-section optical waveguides 29 arranged in a two-dimensional array within soluble glass 30. The number and layout of the optical waveguides 29 is determined by the devices to be coupled to one end of the finished coupler. For example if a two-dimensional diode array is to be coupled to a multi-mode optical fibre then the spacing of the waveguides 29 depends on the layout of the diodes in the array. However, account must also be taken of the reduced dimension of the secondary preform after it has been drawn, the scale factor being the ratio of the preform diameter to the diameter of the drawn fibre. After drawing and cutting the soluble glass 30 is removed from one longitudinal part 31 but the glass 30 is retained at one end 32 where its spacing and layout correspond with the device to be coupled at that end, for example the diode array. At the other end 33, fibres 29' corresponding to the optical waveguides 29 are heated, shaped and fused together to provide a shape which corresponds with a multi-mode optical waveguide to be coupled at the end 33.

Figure 3A:
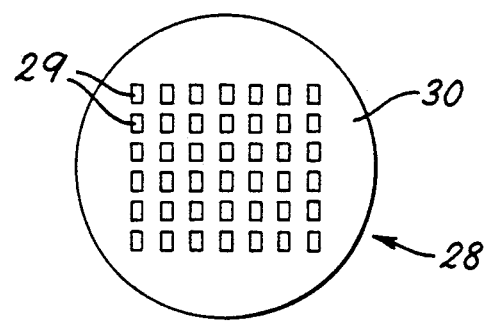
FIGS. 3(a) and 3(b) show cross-sections of a preform for an optical coupler for connecting an array of optical devices to a single fibre, and a coupler made from the preform, respectively.
Figure 3B:
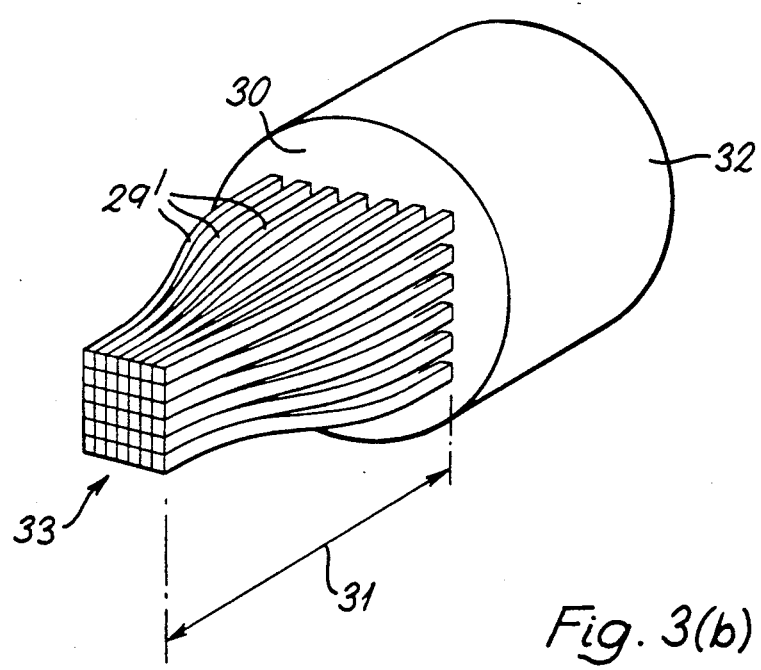

In variations of the arrangements shown in FIG. 3(a) and 3(b) the rows of waveguides 29 may be provided with spacings suitable for the connection of several linear arrays of diodes; and the material between the waveguides 29 need not be formed entirely of material to be removed after the drawing process.

Figure 4A:
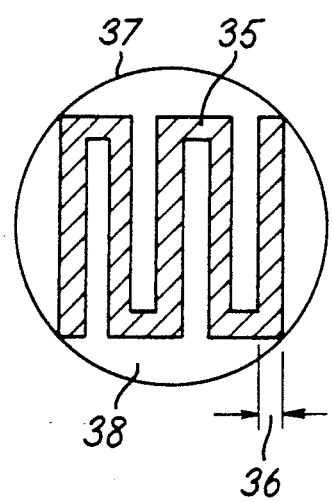
FIGS. 4(a) and 4(b) show the cross-section of a preform and a perspective view of a coupler made from the preform, respectively, the coupler being suitable for connecting a rectangular cross-section optical fibre to a device requiring an elongated rectangular cross-section for coupling.

An embodiment is now discussed in which a particularly complex cross-section is etched from the secondary preform. In FIG. 4a a primary preform 35 can be regarded as a sheet of thickness 36 folded to fit into a secondary preform 37 made circular in cross-section by the use of soluble glass 38. After elongation by drawing, cutting to separate from the remaining preform and dissolving away the soluble glass 38 drawn folded sheet material 35' is heated and shaped by unfolding at one end 39 (see FIG. 4(b)) but fused together in rectangular form at the other end 40. Thus a coupler is formed which has a low aspect ratio at one end at a comparatively high such ratio at the other end. The arrangement is suitable for coupling a wide flat strip waveguide to a square section optical waveguide.

Figure 5A:
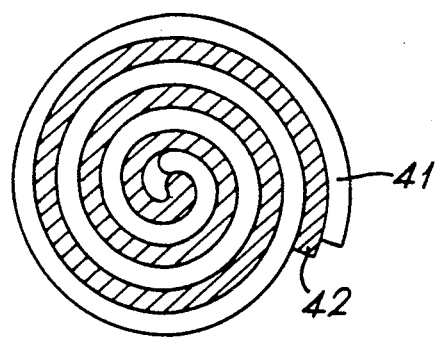
FIGS. 5(a) and 5(b) show the cross-section of a preform and a perspective view of a coupler made from the preform, respectively, the coupler being suitable for connecting a circular cross-section optical fibre to a device requiring an elongated rectangular cross-section for coupling.
Figure 5B:
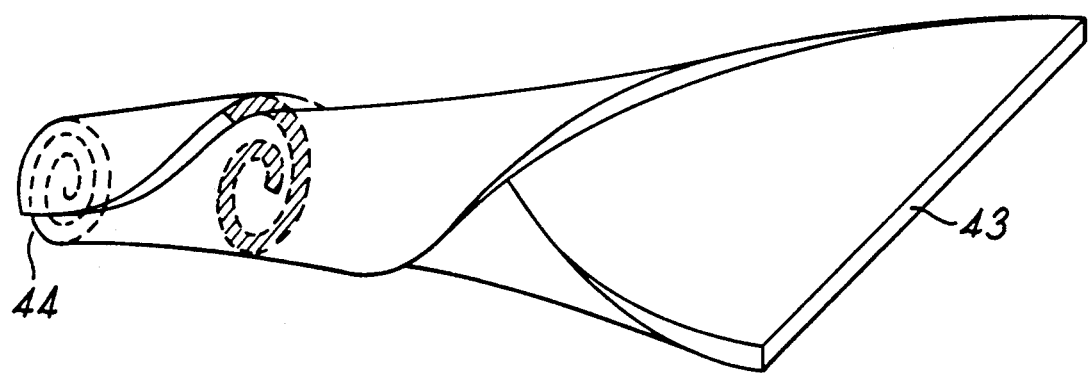

In order to manufacture a coupler for use between a circular optical waveguide and a wide flat strip waveguide, the preform shown in FIG. 5(a) may be used. This preform is made by rolling up a sheet of insoluble glass to form a primary preform 41 with a layer of soluble glass 42 so that a secondary preform is made which has a cross-section with a substantially circular periphery. Internally the secondary preform has two spirals (as shown in FIG. 5(a)). one of the spirals being made of the relatively insoluble glass and the other of soluble glass. After elongation the coupler of FIG. 5(b) can be made by dissolving the soluble glass 42, heating and unwinding the insoluble glass at one end 43 so that it is suitable for coupling to a wide flat strip waveguide and consolidating and fusing together the spiral of insoluble glass at the other end 44 so that it is suitable for coupling to a circular cross-section optical fibre.

Figure 6A:
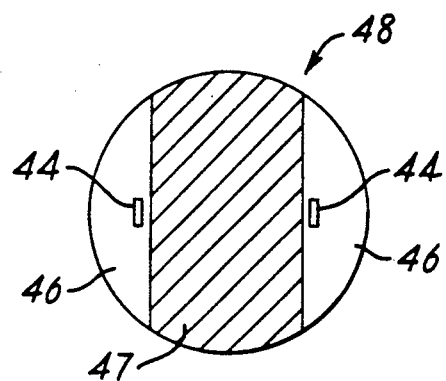
FIG. 6(a) shows a cross-section of a preform for polarisation-preserving couplers, in which material which is later removed in a central region separates optical waveguides.
Figure 6B:
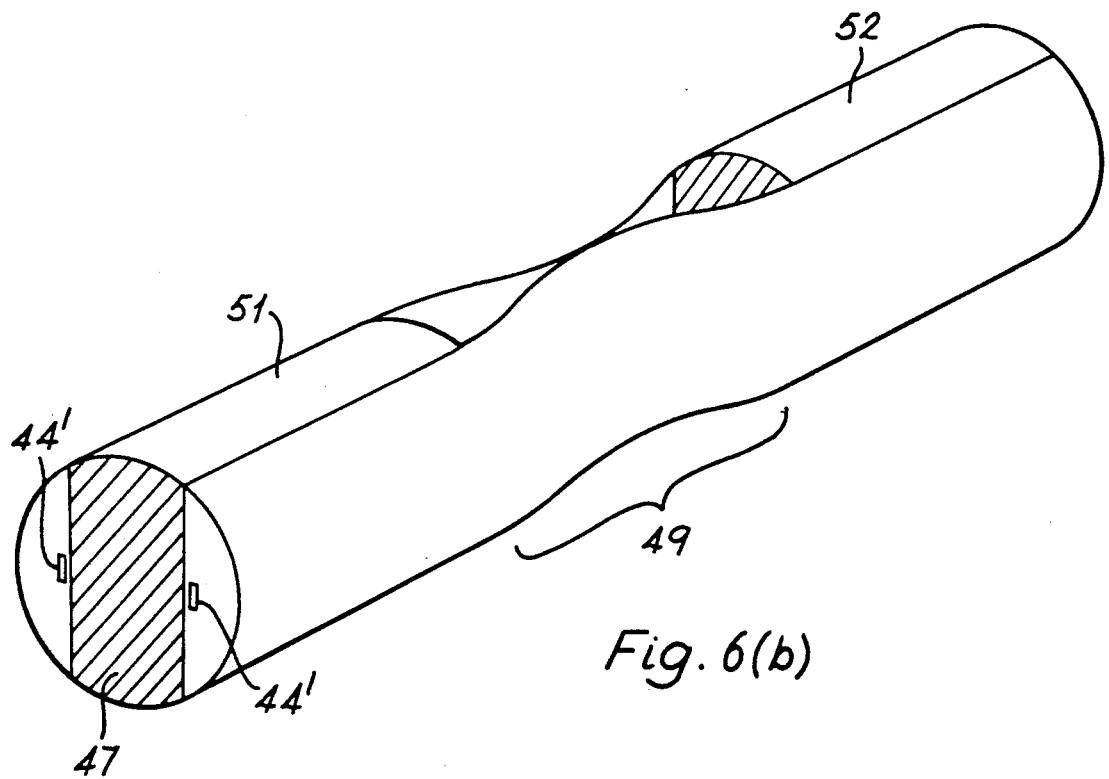
FIG. 6(b) is a perspective view of a coupler made from the preform of FIG. 6(a)

Three ways of making directional couplers are now described. In the first, in which a polarising-preserving coupler is made, a secondary preform is made up as shown in FIG. 6(a) from two primary preforms, each consisting of a rectangular cross-section core 44 in cladding glass 46, both of these glasses being relatively insoluble. Additional soluble glass 47 is positioned between the primary preforms and the whole forms a circular cross-section secondary preform 48. After elongation by drawing and cutting the material 47 is dissolved over a length 49 only, and the waveguides 44' (derived from the cores 44) with their cladding 46 are heated, deformed and fixed so that they are adjacent to one another. As a result coupling is achieved where the waveguides 44' are near enough for their electromagnetic fields to interact but there is no coupling over portions 51 and 52 where the waveguides 44' are far enough apart and separated by the glass 47 to prevent coupling occurring.

Figure 7A:
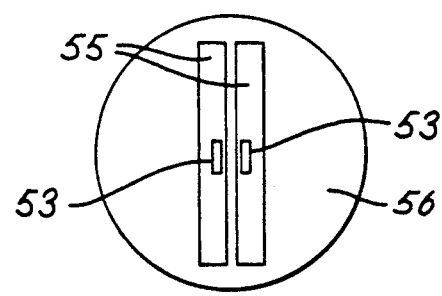
FIG. 7(a) shows a cross-section of a preform for another polarisation-preserving coupler, in which two optical waveguides are adjacent to one another (but later separated except in a central region)
Figure 7B:
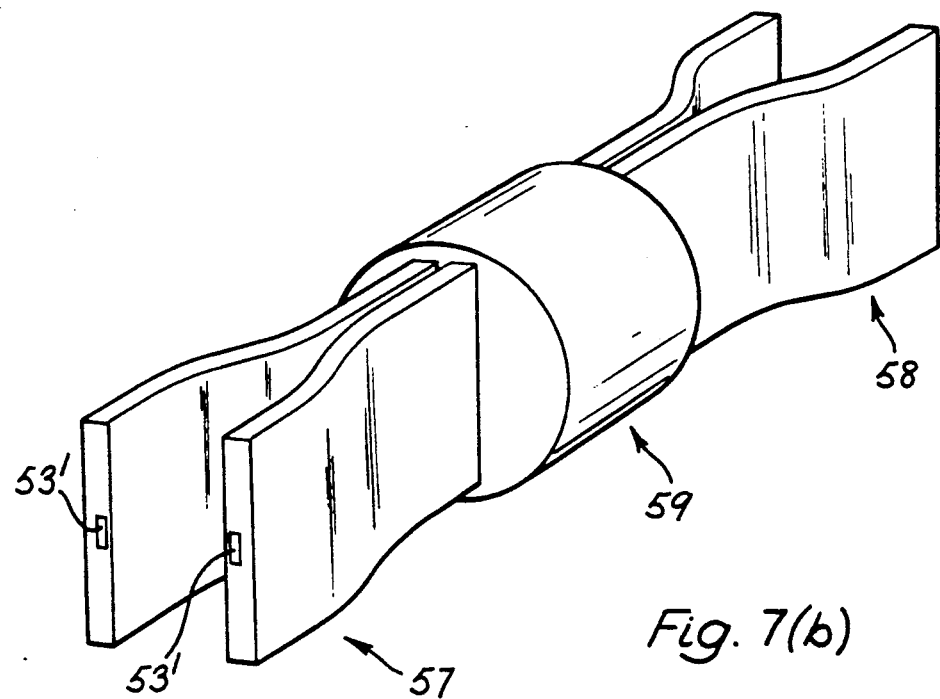
FIG. 7(b) is a perspective view of a coupler made from the preform of FIG. 7(a)

The second way of making directional couplers starts, for a polarising-preserving coupler, by using a preform as shown in FIG. 7(a) where cores 53 with cladding 55 are positioned adjacent to one another in the secondary preform which is given a circular cross-section by the addition of soluble glass 56. After elongation by drawing, and cutting, the soluble glass 56 is dissolved away in regions 57 and 58 but not in a central region 59. Also the waveguides 53' (derived from the cores 53) together with their cladding 55 are heated and separated at the ends of the regions 57 and 58 so that they are too far apart to provide coupling between the waveguides 53'. Hence coupling only occurs in the central region 59 and those parts of the regions 57 and 58 where the waveguides are adjacent to one another. Coupling between the waveguides can be adjusted by varying the length of the section 59 or by fusing together those parts of the portions 57 and 58 where the waveguides are adjacent to one another.

Figure 8A:
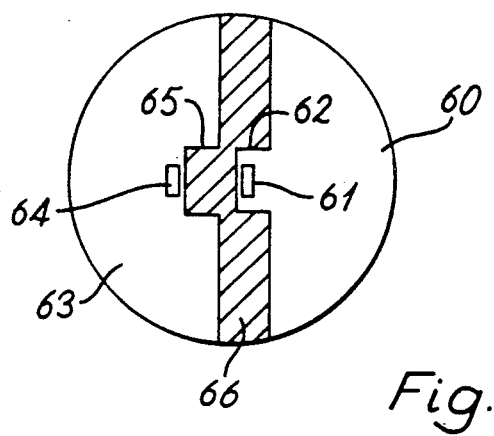
FIG. 8(a) shows a cross-section of a preform for another polarisation-preserving coupler in which positive location between two optical waveguides is provided.
Figure 8B:
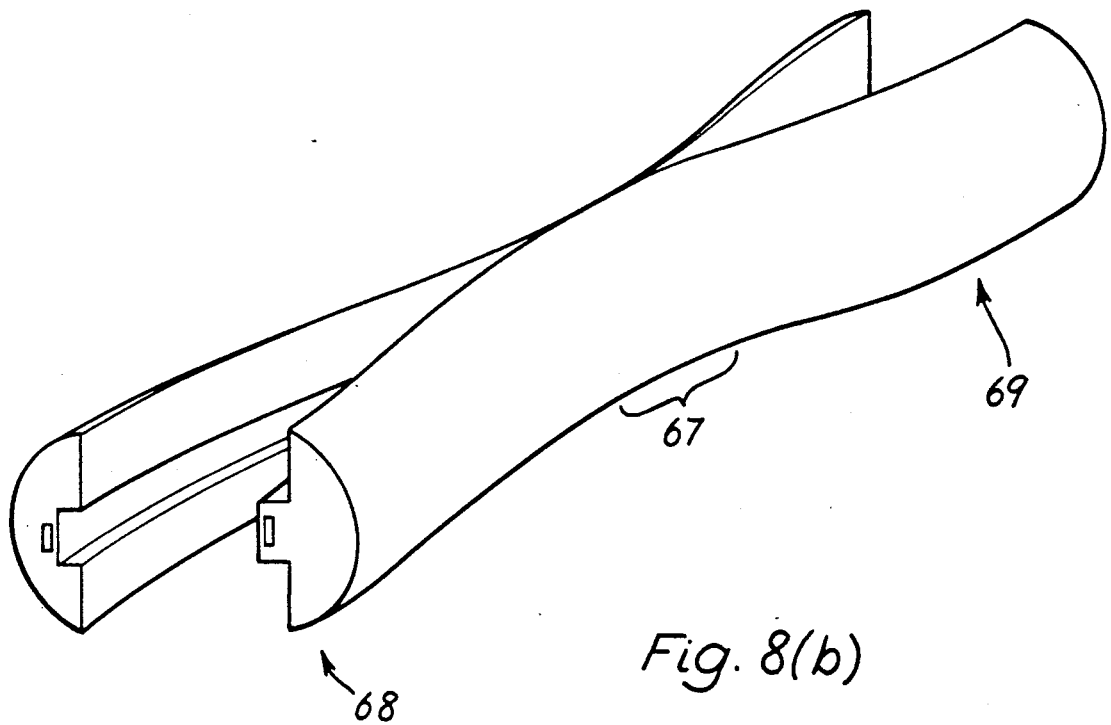
FIG. 8(b) is a perspective view of a coupler which can be made either from the preform of FIG. 8(a) or from two separate optical fibres with a longitudinal ridge and a longitudinal groove, respectively.

In a third method of making directional couplers, the two optical waveguides which are to be coupled to make a polarising-preserving coupler can be made in ridge and groove structures, respectively, so that the waveguides can be positively located adjacent to one another. In FIG. 8(a) a primary preform 60 includes a core 61 in a ridge of cladding material 62 and another primary preform 63 contains a core 64 adjacent to a groove 65 in cladding material. The preforms 60 and 63 are heated and separated by soluble glass 66. When the soluble glass has been dissolved after the preform has been elongated and cut the ridge 62 is located in the groove 65 and the two fused together over a region 67 as indicated in FIG. 8(b), the length of the region 67 providing the required degree of coupling. The preforms 60 and 63 are heated and separated in regions 68 and 69 so that no coupling occurs between the waveguides 61' and 64' derived from the cores 61 and 64, respectively. In a variation of this construction the cores 60 and 64 each with its cladding are made separately as primary preforms, one with a longitudinal ridge and one with a longitudinal groove, by a method of the invention by using soluble glass to make separate secondary preforms of circular cross-section (not shown). The secondary preforms are each drawn and etched to remove the soluble glass. The resulting fibres are fused together with the ridge fitted in the groove over a region sufficient to give the required coupling but they are shaped so that they are separated elsewhere.

Figure 9A:
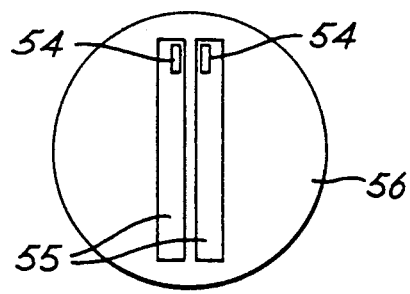
FIGS. 9(a) and 9(b) show the cross-section of a preform and a perspective view of a coupler made using the preform, respectively, the coupler including a coating which interacts with light.
Figure 9B:
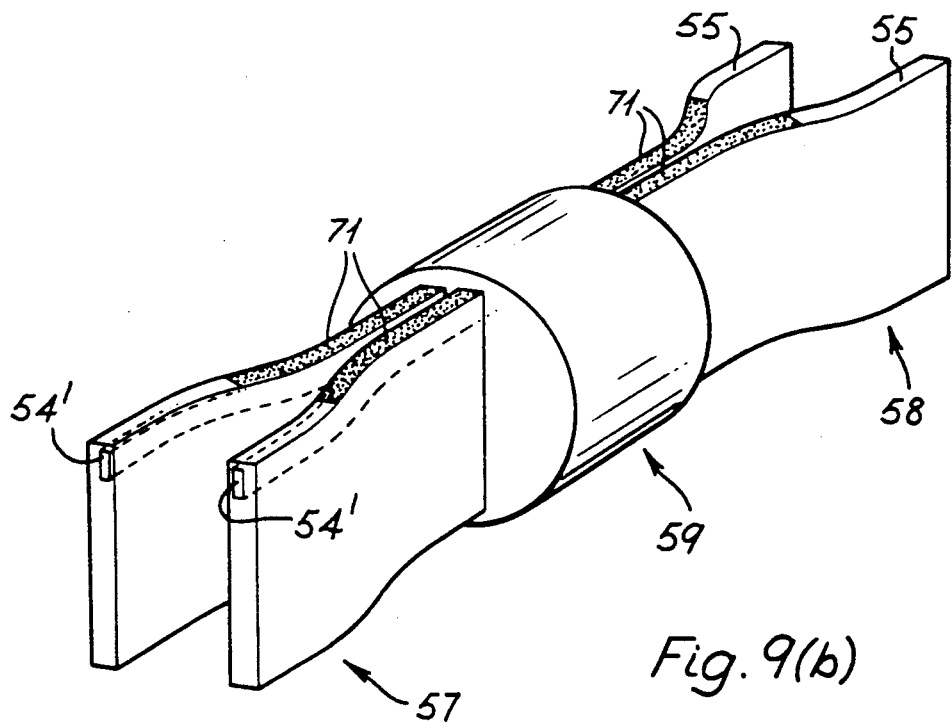

The secondary preform of FIG. 9(a) for a polarising coupler is similar to that of FIG. 7(a) except that the two rectangular cross-section optical cores 54 are located adjacent to the top of the rectangle formed by the cladding material 55. The object of this positioning is to allow waveguides 54' derived from the cores 54 to be coated with an absorption coating 71 shown in FIG. 9(b) illustrating the finished coupler. Light of one polarisation in the waveguides 54' is absorbed by the coating 71 so giving the polarising action. The coating 71 is applied after the waveguides in the regions 57 and 58 have been heated and separated from one another.

Figure 10A:
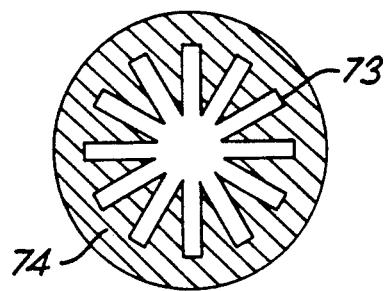
FIGS. 10(a) and 10(b) show the cross-section of a preform and a perspective view of a sensor or light emitter made from the preform, respectively.
Figure 10B:
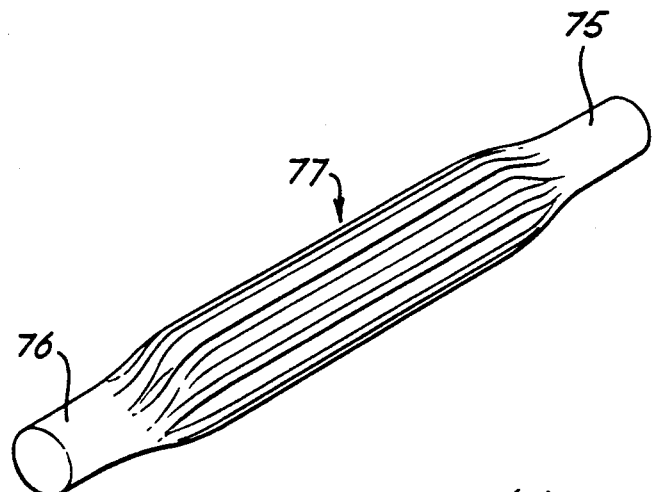

The invention may also be used to manufacture optical sensors based on those described by M. D. DeGrandpre and L. W. Burgess in "Long Path Fibre Optic Sensors for Evanescent Field Absorption Measurements", Anal. Chem., 1988, No. 60, pages 2852-2856. These sensors have an optical core with the largest possible surface area in order to couple an external field of supplied light to the sensor efficiently. The large surface area is coated with or surrounded by light absorbent medium. Alternatively similar arrangements can be used for emitting light by coating the surface area with fluorescent material. A preform for making a sensor of this type is shown in FIG. 10(a) where the primary preform comprises a "star shape" 73 formed of a relatively insoluble glass surrounded by soluble glass 74 to give the required circular cross-section for the secondary preform. The glass 74 is dissolved from the secondary preform after drawing and cutting, and the radial extensions from the core of the star shape are bent over and fused together at ends 75 and 76 of the sensing element as shown in FIG. 10(b). A central region 77 is either coated with or immersed in absorbent or fluorescent material (not shown). The ends 75 and 76 allow conventional multi-mode fibres to be used as signalling and feed-back connections.

An example of the application of methods of the invention applied to the manufacture of endoscopes is now described. In some circumstances it is an advantage if the image produced at one end of the endoscope is enlarged compared with that other end which receives light from the object being observed.

The manufacture of such an endoscope is now described. Various bundles of optical fibres can be used and an example is now mentioned. Individual fibres for bundling together to form an endoscope are shown in FIGS. 11(a) to 11(d). In these figures the optical core material is designated as 80 and its cladding as 81. In FIGS. 11(b) and 11(d) the cladding is surrounded by soluble glass 82. Groups of large numbers of these fibres with or without the soluble glass 82 are grouped together as shown at 83 in FIG. 12(a), with FIG. 12(b) showing an enlarged portion of the array 83 containing fibres of the type shown in FIG. 11(b). The bundle 83 which forms the primary preform is surrounded by soluble glass 84 to give the required circular cross-section and the secondary preform so produced is drawn by the process described in connection with FIG. 1.

Figure 13:
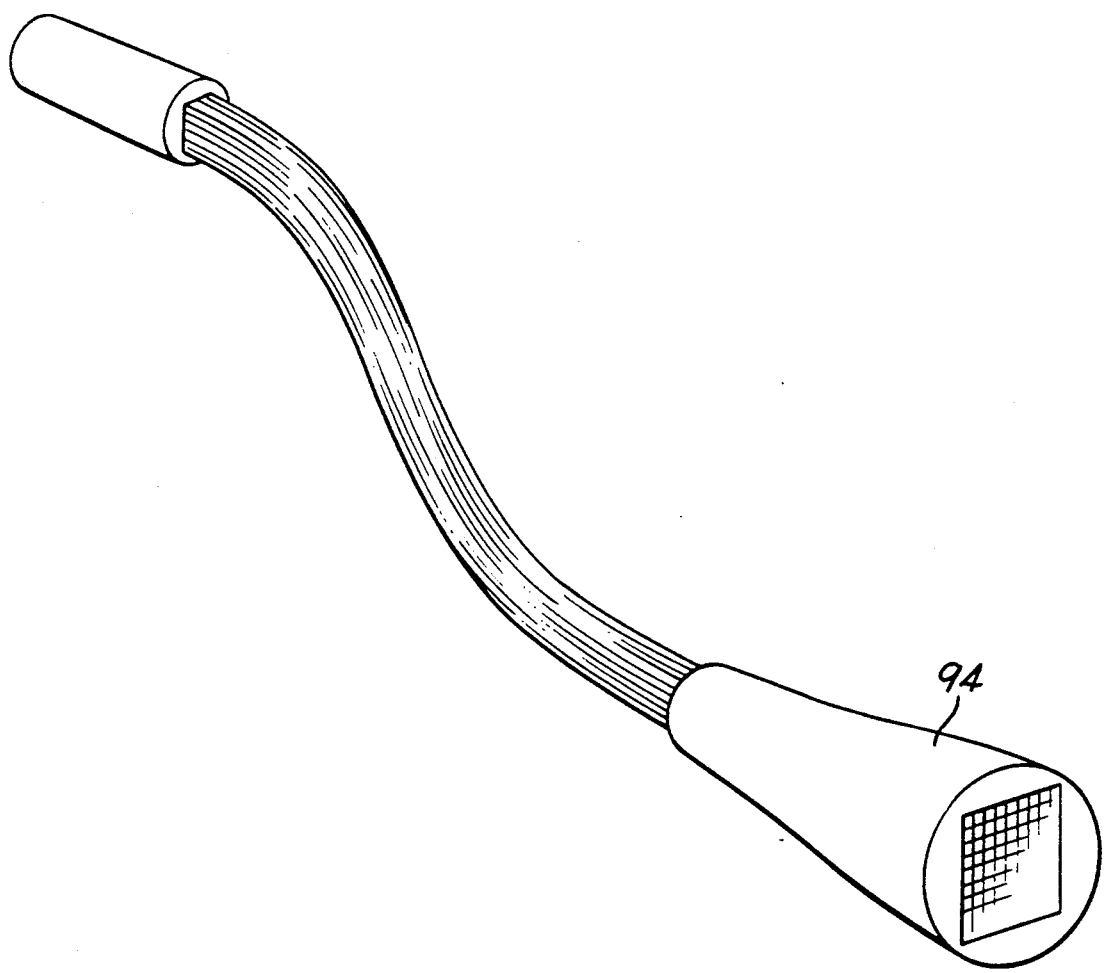
FIG. 13 is a perspective view of bundled optical fibres for an endoscope with one end which has not been drawn.

However, the drawn preform is left without cutting or so cut that an enlarged end remains which has not been drawn, or is only partially drawn. The acid soluble material is then removed except at ends 93 and 94 (see FIG. 13). The end 94 has not been through the heating zone shown in FIG. 1, and as a result it is of enlarged cross-section so that the image appearing on the ends of the fibre is large in comparison with the object observed at the other end, and since the fibres between these ends are not joined together the bundle is flexible between the ends and can be used in an endoscope.

Another feature of the invention is now described in which a second soluble glass having a different solubility from the first is used.

Figure 4B:
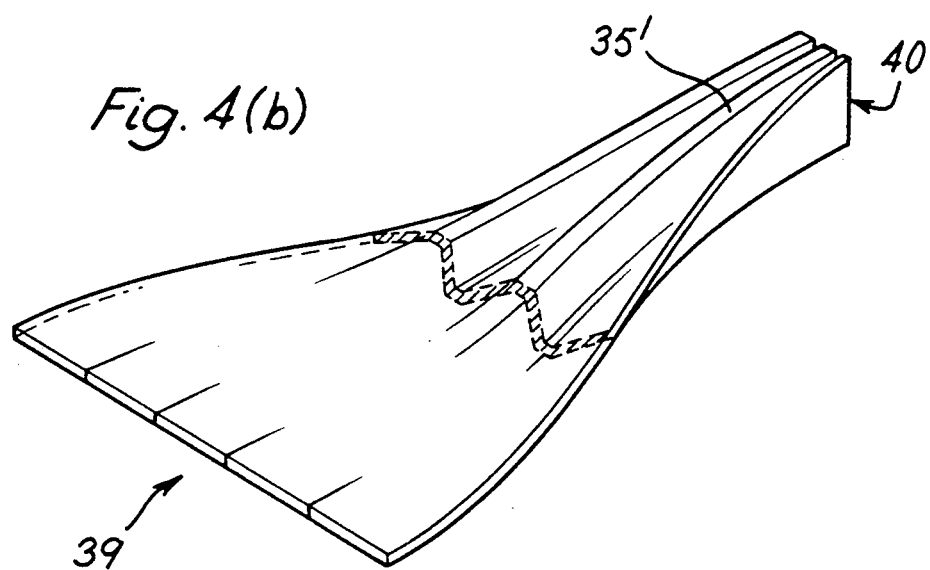
Figure 14A:
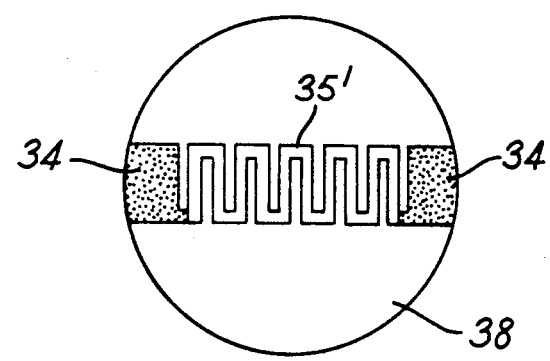
FIGS. 14(a) and 14(b) show the cross-section of a preform for making an optical coupler and illustrate an operation of manipulating a product drawn from the preform after a first type of soluble glass has been removed and using another type of soluble glass, which is later removed, as an aid in carrying out the manipulation.
Figure 14B:
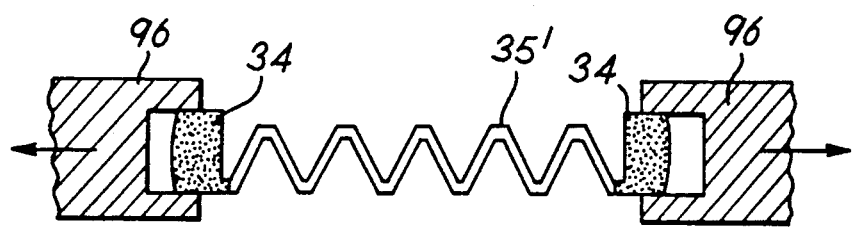

The production of the couplers shown in FIG. 4(b) can be made easier by the employment of this feature. A secondary preform for this purpose is shown in FIG. 14(a) where a folded sheet of insoluble glass 35' is located between glass 34 which is less soluble than the glass 38. The glass 38 makes up the circular section secondary preform required for drawing and when this glass has been dissolved from the drawn preform, the product shown in FIG. 14(b) results. This figure shows the glass 35' held by gripping tools 96 which, after heating the product, are used to pull out one end to give the end 39 (see FIG. 4(b)) a wide elongated cross-section, and to compress the folds of the glass 35' at the other end to give the rectangular end 40. After this shaping process the glass 34 is removed in a second dissolving process.

Figure 15A:
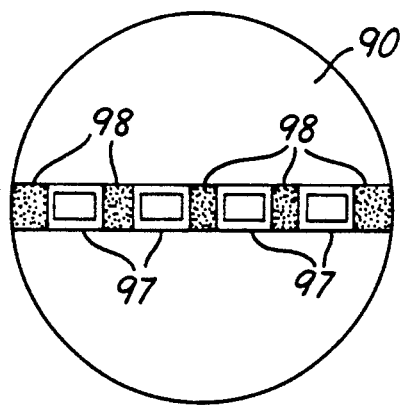
FIG. 15(a) shows the cross-section of a preform employing two different solubility glasses.
Figure 15B:
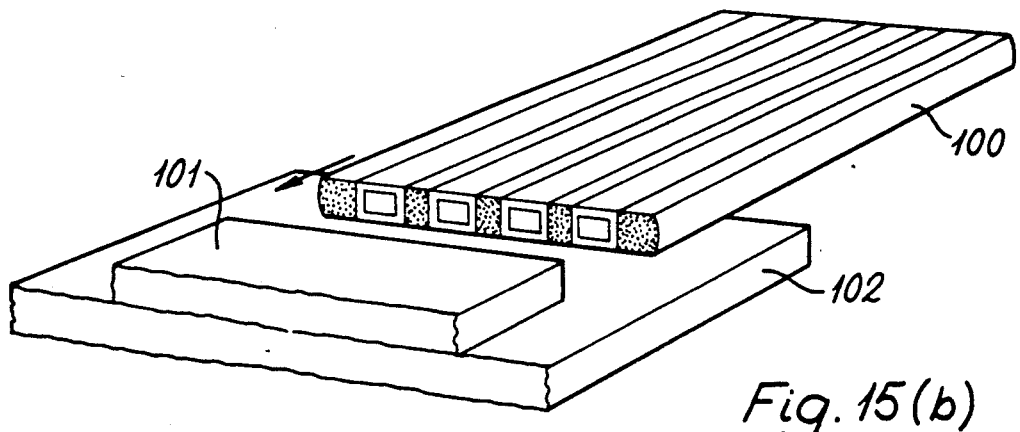
FIG. 15(b) is a perspective view of a product drawn from the preform of FIG. 15(a) being joined to a diode array before the second glass is removed.
Figure 15C:
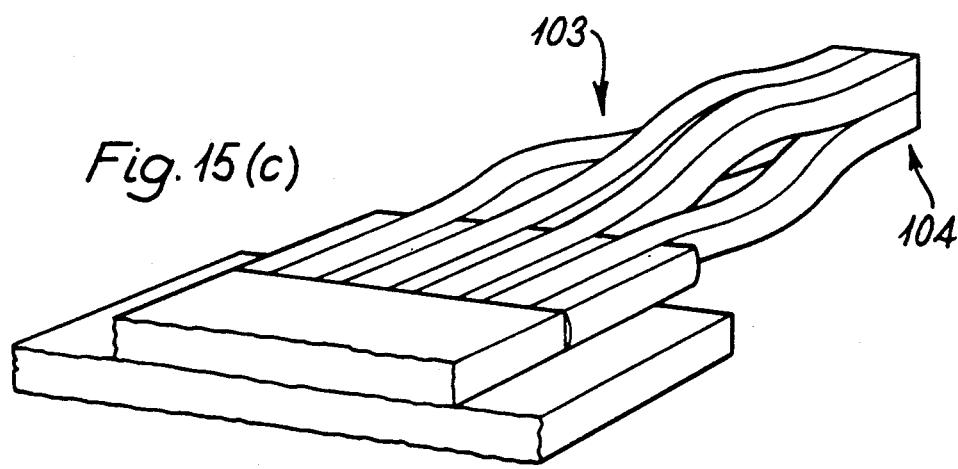
FIG. 15(c) is a perspective view of the final product and diode array with the second glass partially removed.

In addition to the ways for producing a coupling element for use, for example, between a diode array and an optical fibre described in connection with FIGS. 3(a) and 3(b). a method is now described which uses the second soluble glass. The secondary preform used (see FIG. 15(a)) comprises rectangular cores coated with cladding glass 97 spacers (some of which are designated 98) of a less soluble glass, and more soluble glass 90 making up the circular cross-section. After drawing and cutting the glass 90 is dissolved leaving the elongated bundle of rectangular fibres and spacers 100 shown in FIG. 15(b). This bundle is then connected to a diode array 101 located on a base plate 102. In the array 101 the diodes (not shown) are spaced by an amount determined by the construction of the array and therefore the spacers 98 are initially designed to accommodate this spacing, taking into account the reduction in size due to drawing. After connection to the diode array the less soluble glass spacers 98 are dissolved in the region 103 (FIG. 15(c)) and the resulting free optical fibres are gathered together and fused to form an end 104 which has a suitable cross-section for coupling to an optical fibre to be attached at the end 104.

Figure 16A:
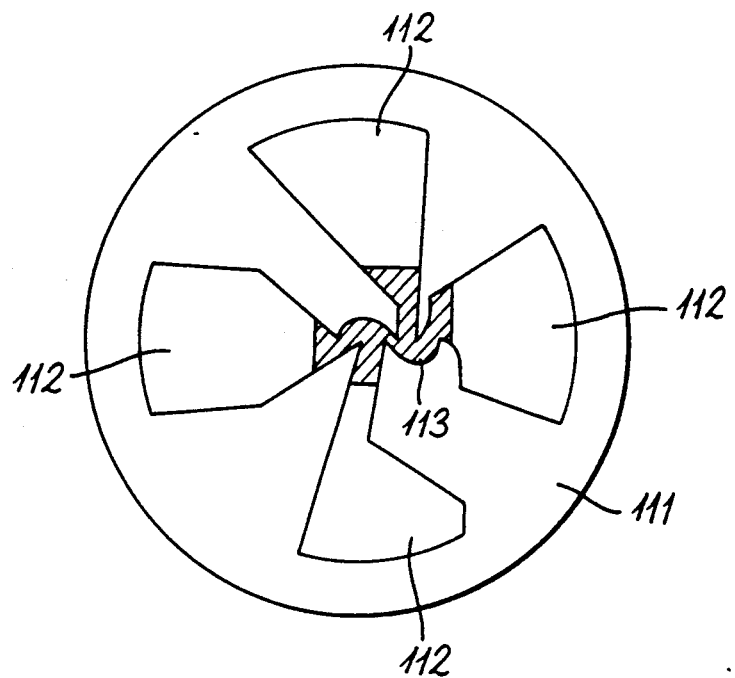
FIGS. 16(a) and 16(b) show the cross-section of a preform and a perspective view of a radio-isotope separator made from the preform, respectively.
Figure 16B:
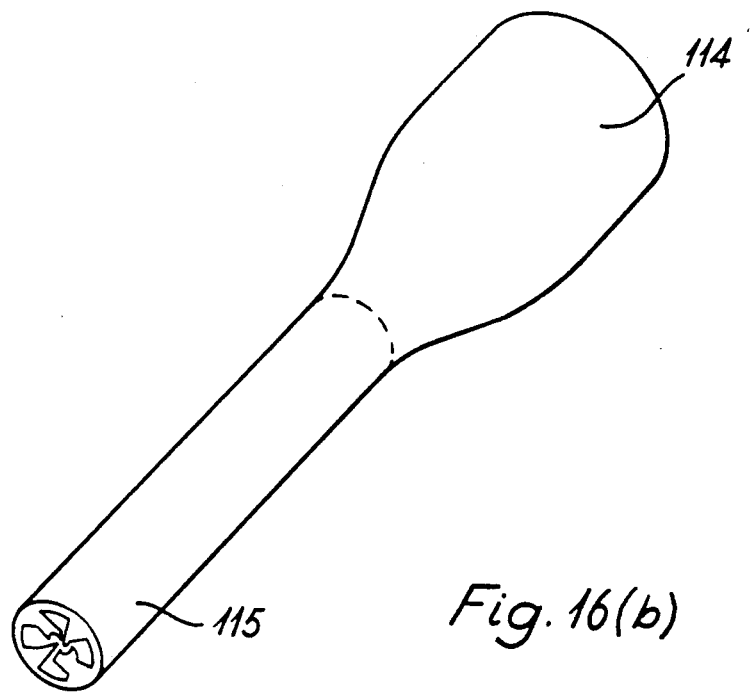

As has been mentioned the invention may also be used for non-optical elements such as micromechanical elements, for example the component shown in FIGS. 16(a) and 16(b) which has several channels 112 with connections 113 defined in a particular way for the separation of radio-isotopes. A primary preform 111 has a circular outer periphery in cross-section and an internal shape defined by internal peripheries. This internal shape is to be preserved after the preform has been drawn. For this purpose the channels 112 are filled with a first more soluble glass while the internal connections 113 are filled with a second relatively less soluble glass. The component to be constructed is shown in FIG. 16(b) and has one end 114 which has not been necked down by the drawing process and the other end 115 which has been drawn. For this component the internal connections between the channels are to remain at the end 114 but removed at the other end 115. Thus the first leaching process dissolves away the glass 112 throughout the whole component but a second leaching process which dissolves away the glass 113 is only carried out in the necked down portion for some way along from the end 115.

Embodiments of the invention have been specifically described above but it can, of course, be put into practice in many other ways.

I claim:

1. A method of manufacturing objects from material which can be drawn plastically, comprising the steps of:
forming a secondary preform from at least one primary preform formed in a first glass by combining a second glass with the primary preform, the first and second glasses both being deformable plastically and one of the said glasses being removable from the other glass, reducing the viscosity of a zone of the secondary preform while plastically drawing out the secondary preform to give an elongated product with a reduced cross-section, the secondary preform having a cross-sectional boundary whose shape, as defined by relative dimensions, is preserved during drawing by the presence of the first and second glasses, removing the one glass from at least part of the elongated product, said removing step including etching the one glass, and plastically deforming the material of the elongated product, after the one glass has been at least partially removed, to reshape the product permanently.

2. A method according to claim 1 wherein the one glass is the second glass and the primary preform or preforms have a cross-sectional outer or inner periphery which is preserved during drawing by the presence of the second glass.

3. A method according to claim 2 wherein:
the first glass includes third and fourth glasses, the third glass being removable from the fourth glass, and
at least partially removing the third glass from the fourth glass from the one glass has been at least partially removed from the first glass.

4. A method according to claim 3 wherein after the second material has been at least partially removed, the third glass facilitates manipulation of the first glass before it is removed.

5. A method according to claim 2 of manufacturing optical coupling elements wherein the secondary preform includes a plurality of primary preforms having cross-sectional shapes which can be assembled to conform to first and second cross-sectional shapes of respective optical devices which are to be coupled optically, and
the step of plastically deforming the product includes arranging those portions of the first glass remaining after the second glass has been removed to assemble the cross-sectional shapes of the portions to give two ends to the product, the ends having cross-sectional shapes which conform with the first and second cross-sectional shapes, respectively.

6. A method of manufacturing optical coupling elements according to claim 2, for coupling a plurality of optical devices to a single device wherein:
the secondary preform includes a plurality of primary preforms each of which has a cross-sectional shape which corresponds to the cross-sectional shape of respective first optical devices, the cross-sectional shapes of the primary preforms being capable of assembly to conform with the cross-sectional shape of a second optical device, and
the step of plastically deforming the product includes separating those portions of the first glass remaining after the second glass has been removed at one end to provide respective terminations for coupling the first optical devices, and
assembling the portions at the other end to give a cross-sectional shape which corresponds to that of the second optical device.

7. A method of manufacturing optical coupling elements according to claim 2, for coupling a number of optical devices to a single such device wherein:
the secondary preform includes a plurality of primary preforms each of which has a cross-sectional shape which corresponds to the cross-sectional shape of respective first optical devices, the cross-sectional shapes of the primary preforms being capable of assembly to conform with the cross-sectional shape of a second optical device,
the step of removing the second glass is partial, the second glass not being removed at one end of the product whereby, after drawing, the ends of those portions of the first glass at the said one end are spaced by the second glass to conform with the spacing of the first optical devices, and
the step of plastically deforming the product includes assembling the portions at the other end to give a cross-sectional shape which corresponds to that of the second optical device.

8. A method according to claim 2 of manufacturing optical coupling elements, wherein the primary preform has a cross-sectional shape which can be rearranged to conform to first and second cross-sectional shapes of respective optical devices which are to be coupled optically, and
the step of plastically deforming the product includes shaping the first glass after the second glass has been removed to rearrange the cross-sectional shape of the first glass at the ends of the said product to give the said ends cross-sectional shapes which correspond with the first and second cross-sectional shapes, respectively.

9. A method according to claim 2 of making an optical directional coupler wherein,
the secondary preform includes two primary preforms each comprising a core and cladding separated by secondary glass, the cores of the primary preforms being rectangular in cross-section and near the surface of the cladding where the primary preforms are adjacent but the secondary glass being of such thickness and composition after drawing that significant coupling between optical waves in the cores cannot occur, and
the step of removing the second glass includes removal at least at an intermediate portion of the product, and
the step of plastically deforming the product includes locating the drawn cores in close proximity in the intermediate portion.

10. A method according to claim 2 of making an optical directional coupler wherein,
the secondary preform includes two primary preforms each comprising a core and cladding, the cores of the primary preforms being rectangular in cross-section and near the surface of the cladding where the primary preforms are adjacent to ensure that after drawing coupling occurs between optical waves in the cores, and
the step of removing the second glass includes removal at ends of the product,
the step of plastically deforming the product includes separating the cores, and
the method includes cladding at the said ends to prevent significant coupling between optical waves in the cores.

11. A method according to claim 9 or 10 wherein the cores are also near the surface of the cladding where the primary preforms correspond to regions, of the product adjacent to positions in which coupling occurs between light in the cores, and in which the second glass is removed, and the method including coating the said regions with a material which interacts with light in the cores after the second glass has been removed.

12. A method of manufacturing an optical directional coupler, comprising:

manufacturing first and second optical waveguides according to claim 2, each of which comprises a core surrounded by cladding with a region in which the core is near an adjacent surface of the cladding, the region in the first optical waveguide comprising a longitudinal ridge along the adjacent surface of the first optical waveguide, the region in the second optical waveguide being adjacent to a longitudinal groove in the adjacent surface of the second optical waveguide, and the ridge and groove and the adjacent surfaces matching in that the ridge just fits into the groove with the cores adjacent to one another when the adjacent surfaces touch, and the step of plastically deforming the product includes fixing the first and second optical waveguides together with the ridge fitted into the groove along an intermediate region of each first and second optical waveguide but with the ends of the waveguides spaced apart.

13. A method of manufacturing objects from material which can be drawn plastically, comprising the steps of:

forming a secondary preform from at least one primary preform formed in a first glass by combining a second glass with the primary preform, the first and second glasses being plastically deformable and one of the glass can be removed from the other glass, reducing the viscosity of a zone of the secondary preform while plastically drawing out the secondary preform to give an elongated product with a reduced cross-section, the secondary preform having a cross-sectional boundary whose shape, as defined by relative dimensions, is preserved during drawing by the presence of the first and second glasses, and removing the one glass from at least part of the said elongated product via etching, wherein the first glass includes third and fourth glasses, the third glass being removable from the fourth glass, and wherein the method includes at least partially removing the third glass from the fourth glass after the one glass has been at least partially removed from the first glass.

14. A method according to claim 13 wherein the said one glass is the second glass and the primary preform or preforms have a cross-sectional outer or inner periphery which is preserved during drawing by the presence of the second glass.

15. A method according to claim 14 for manufacturing an optical coupler for coupling spaced optical devices to a single optical device, including forming the primary preform from optical fibres, each comprising a core and cladding, by spacing the fibres with the third glass to conform after drawing to the spacing of the spaced optical devices, wherein the step of removing the third glass comprises removing the third glass from the drawn product except at one end, and the method includes forming the fibres at the other end of the product into a cross-section which is suitable for coupling to the single optical device.

16. A method according to claim 14 including forming the primary preform with the first glass having a cross-section with a circular outer periphery and a non-circular inner periphery, and forming the secondary preform by filling the region bounded by the inner periphery with the second glass.

17. A method according to claim 16, including forming the primary preform so that the inner periphery comprises respective regions of the third and fourth glasses.

18. A method according to claim 17 for manufacturing a device for separating radio-isotopes, including:

forming the primary preform with the third and fourth glass defining a plurality of inner peripheries and the third glass filling a connection which joins a plurality of channels, each having walls formed by respective ones of the inner peripheries, and wherein the product includes a portion at one end which has not been drawn, and the third glass is only removed from that portion of the product which has been drawn, thereby connecting the channels in that portion.

19. A method of manufacturing objects from material which can be drawn plastically, comprising the steps of:

forming at least one primary preform in a first glass by bundling together a plurality of optical fibres, each of which has a core and cladding, with the fibres spaced in cross-section according to a predetermined requirement, forming a secondary preform from said at least one primary preform by combining a second glass with the primary preform, the first and second materials being plastically deformable and one of the glasses being removable from the other glass, reducing the viscosity of a zone of the secondary preform while plastically drawing out the secondary preform to give an elongated product with a reduced cross-section, the secondary preform having a cross-sectional boundary whose shape, as defined by relative dimensions, is preserved during drawing by the presence of the first and second materials, and removing the one glass from the elongated product, except at ends of the elongated product, using a removal agent, and wherein the product includes a portion at one end which has not been drawn, or has been only partially drawn.

20. A method according to claim 19 further comprising coating each fibre with a layer of the second material before bundling and fixing the coated fibres together to form the primary preform.

21. A method according to claim 1, 13 or 19 including coating the elongated product after the, at least partial, removal of the second glass with an optical material.

22. An object manufactured according to a method of claim 1, 13 or 19.

23. A method according to claim 1, 13 or 19 further including a removal agent that is a liquid or gas in which the second glass dissolves, physically or chemically, more readily than the first glass.

24. A method according to claim 1, 13 or 19 wherein the addition of the second glass to the primary preform gives the secondary preform an outer periphery which is circular in cross-section, or square in cross-section with a diagonal dimension of the square which is large compared with the largest cross-sectional dimension of the primary preform.

25. A method according to claim 1, 13 or 19 wherein in order to reduce viscosity in the zone, the secondary preform is heated at the zone.

* * * * *